US011461551B1

(12) United States Patent
Thaine et al.

(10) Patent No.: US 11,461,551 B1
(45) Date of Patent: Oct. 4, 2022

(54) SECURE WORD SEARCH

(71) Applicant: Private AI Inc., Toronto (CA)

(72) Inventors: Patricia Araujo Thaine, Toronto (CA); Gerald B. Penn, Toronto (CA)

(73) Assignee: Private AI Inc., Toronto (CA)

( * ) Notice: Subject to any disclaimer, the term of this patent is extended or adjusted under 35 U.S.C. 154(b) by 332 days.

(21) Appl. No.: 16/660,918

(22) Filed: Oct. 23, 2019

Related U.S. Application Data

(60) Provisional application No. 62/749,517, filed on Oct. 23, 2018.

(51) Int. Cl.
| | |
|---|---|
| G06F 40/284 | (2020.01) |
| G10L 13/08 | (2013.01) |
| G10L 15/18 | (2013.01) |
| H04L 9/00 | (2022.01) |
| H04L 9/30 | (2006.01) |
| G06F 16/248 | (2019.01) |
| G06F 16/951 | (2019.01) |
| G06F 3/16 | (2006.01) |
| G06F 16/242 | (2019.01) |

(52) U.S. Cl.
CPC .......... *G06F 40/284* (2020.01); *G06F 3/167* (2013.01); *G06F 16/243* (2019.01); *G06F 16/248* (2019.01); *G06F 16/951* (2019.01); *G10L 13/08* (2013.01); *G10L 15/18* (2013.01); *H04L 9/008* (2013.01); *H04L 9/3093* (2013.01)

(58) Field of Classification Search
CPC ...... G06F 40/284; G06F 3/167; G06F 16/243; G06F 16/248; G06F 16/951; G10L 13/08; G10L 15/18; H04L 9/008; H04L 9/3093
See application file for complete search history.

(56) References Cited

U.S. PATENT DOCUMENTS

| | | | | |
|---|---|---|---|---|
| 9,742,556 | B2 * | 8/2017 | Bacon | H04L 9/008 |
| 10,644,876 | B2 * | 5/2020 | Williams | H04L 9/302 |
| 10,812,252 | B2 * | 10/2020 | Laine | G06F 9/30014 |
| 10,831,919 | B2 * | 11/2020 | Carpov | H04L 9/008 |
| 11,188,719 | B1 * | 11/2021 | Anand | G06N 3/08 |
| 11,200,243 | B2 * | 12/2021 | Venkataraman | H04N 21/42203 |
| 2013/0170640 | A1 * | 7/2013 | Gentry | H04L 9/3093 380/30 |

(Continued)

OTHER PUBLICATIONS

Fontaine, Caroline et al., "A Survey of Homomorphic Encryption for Nonspecialists"; EURASIP: Journal on Information Security; <http://file.scirp.org/pdf/JIS20090100004_52817007.pdf>; Issue 1; pp. 41-50; Aug. 2009 (10 pages).

(Continued)

*Primary Examiner* — Fariba Sirjani
(74) *Attorney, Agent, or Firm* — Ferguson Braswell Fraser Kubasta PC

(57) ABSTRACT

A method may include generating word string vectors for word strings in a document, obtaining encrypted word string vectors by encrypting the word string vectors, generating a search vector for a search query, obtaining an encrypted search vector by encrypting the search vector, calculating encrypted distances between the encrypted word string vectors and the encrypted search vector, obtaining a decrypted distance by decrypting an encrypted distance, and using the decrypted distance, determining a semantic match between the search query and the document.

20 Claims, 6 Drawing Sheets

(56) References Cited

U.S. PATENT DOCUMENTS

| | | | |
|---|---|---|---|
| 2015/0293976 A1* | 10/2015 | Guo | G06N 3/0454 |
| | | | 707/706 |
| 2017/0063525 A1* | 3/2017 | Bacon | H04L 9/008 |
| 2018/0198601 A1* | 7/2018 | Laine | G06F 9/30014 |
| 2018/0300497 A1* | 10/2018 | Carpov | H04L 9/008 |
| 2018/0373787 A1* | 12/2018 | Liu | G06F 16/338 |
| 2019/0140818 A1* | 5/2019 | Bent | H04L 63/0428 |
| 2019/0266166 A1* | 8/2019 | Venkataraman | |
| | | | H04N 21/42203 |
| 2019/0318118 A1* | 10/2019 | Narayanam | G06F 21/6209 |

OTHER PUBLICATIONS

Turian, Joseph et al., "Word representations: A simple and general method for semi-supervised learning"; ACL '10: Proceedings of the 48th Annual Meeting of the Association for Computational Linguistics; pp. 384-934; Uppsala, Sweden; Jul. 11-16, 2010 (11 pages).

Mikolov, Tomas et al., "Distributed Representations of Words and Phrases and their Compositionality"; <https://papers.nips.cc/paper/5021-distributed-representations-of-words-and-phrases-and-their-compositionality.pdf>; Oct. 2013 (9 pages).

Kutuzov, Audrey, "Lecture 1: Linguistic Foundations of Distributional Semantics"; INF5820 Distributional Semantics: Extracting Meaning from Data; <https://www.uio.no/studier/emner/matnat/ifi/INF5820/h16/lectures/distsem1_print.pdf>; Oct. 26, 2016 (10 pages).

\* cited by examiner

Semantic Space
200

Co-Occurrence Matrix 210

A simple example of a symmetric word-word co-occurrence matrix:

|         | vector | meaning | hamster | corpus | weasel | animal |
|---------|--------|---------|---------|--------|--------|--------|
| *vector*  | 0      | 10      | 0       | 8      | 0      | 0      |
| *meaning* | 10     | 0       | 1       | 15     | 0      | 0      |
| *hamster* | 0      | 1       | 0       | 0      | 20     | 14     |
| *corpus*  | 8      | 15      | 0       | 0      | 0      | 2      |
| *weasel*  | 0      | 0       | 20      | 0      | 0      | 21     |
| *animal*  | 0      | 0       | 14      | 2      | 21     | 0      |

We produced meaningful representations in a completely unsupervised way!

SECURE WORD SEARCH

CROSS-REFERENCE TO RELATED APPLICATION

This application claims benefit under 35 U.S.C. § 119(e) to U.S. Provisional Patent Application Ser. No. 62/749,517, filed on Oct. 23, 2018, having the same inventors, and entitled, "SECURE WORD SEARCH." U.S. Provisional Patent Application Ser. No. 62/749,517 is incorporated herein by reference in its entirety.

BACKGROUND

Improving the accuracy of search queries submitted to databases (e.g., databases residing in the cloud) while minimizing the chance of identifying the records contained in the databases is a difficult task. One goal of homomorphic encryption is to enable search for or through confidential documents without disclosing any clues regarding the contents or meanings of the documents. For example, without appropriate use of cryptographic systems, it may be possible for an attacker to learn information about confidential documents by analyzing intercepted search queries or their answers. Providing useful semantic search capabilities over encrypted documents is key to creating secure information retrieval systems, natural language processing systems, and machine learning systems which are also practical.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating word string vectors for word strings in a document, obtaining encrypted word string vectors by encrypting the word string vectors, generating a search vector for a search query, obtaining an encrypted search vector by encrypting the search vector, calculating encrypted distances between the encrypted word string vectors and the encrypted search vector, obtaining a decrypted distance by decrypting an encrypted distance, and using the decrypted distance, determining a semantic match between the search query and the document.

In general, in one aspect, one or more embodiments relate to a system including a computer processor, a repository including a search query and documents including word strings, and a vector manager executing on the computer processor configured to generate word string vectors for word strings of a document, generate a search vector for the search query, and using a decrypted distance, determine a semantic match between the search query and the document. The system further includes a cryptography manager executing on the computer processor configured to obtain encrypted word string vectors by encrypting the word string vectors, obtain an encrypted search vector by encrypting the search vector, calculate encrypted distances between the encrypted word string vectors and the encrypted search vector, and obtain the decrypted distance by decrypting an encrypted distance.

In general, in one aspect, one or more embodiments relate to a non-transitory computer readable medium including instructions that, when executed by a computer processor, perform generating word string vectors for word strings in a document, obtaining encrypted word string vectors by encrypting the word string vectors, generating a search vector for a search query, obtaining an encrypted search vector by encrypting the search vector, calculating encrypted distances between the encrypted word string vectors and the encrypted search vector, obtaining a decrypted distance by decrypting an encrypted distance, and, using the decrypted distance, determining a semantic match between the search query and the document.

Other aspects of the invention will be apparent from the following description and the appended claims.

DETAILED DESCRIPTION

Figure 1:
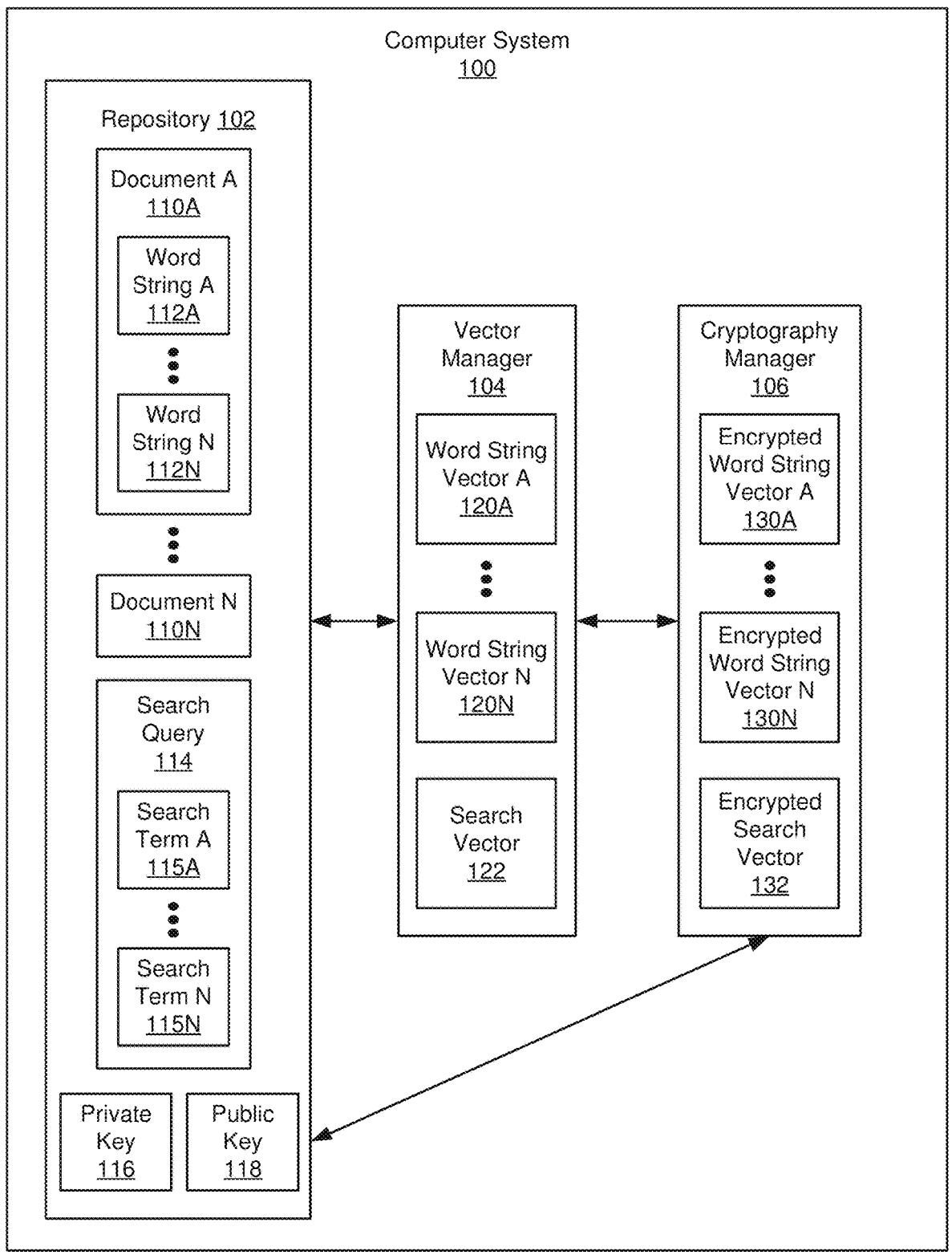
FIG. 1, FIG. 2A, and FIG. 2B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method and system for secure word search. In one or more embodiments, word strings in a document are encoded as word string vectors that represent the meaning of each word string as a point in a multi-dimensional semantic space. Word strings that appear in similar contexts may correspond to word string vectors that are near each other in the multi-dimensional semantic space. The word string vectors may then be encrypted using a homomorphic encryption scheme. Similarly, a search query may be encoded as one or more search vectors, which may then be encrypted. A homomorphic encryption scheme specifies one or more operations, and associates to each specified operation an analogous operation. The result of a specified operation performed on two unencrypted values is equal to the result of decrypting the result of performing the analogous operation for that specified operation on the respective encryptions of the two values. For example, the homomorphic encryption scheme may specify that a distance function has an analogous operation that can be applied to two argument values. Continuing this example, the analogous operation may be applied to an encrypted search vector and an encrypted word string vector, and the result of applying this operation is an encrypted distance. The encrypted distance, when decrypted, produces the distance between the unencrypted search vector and the unencrypted word string vector.

An encrypted distance may be calculated between each encrypted word string vector and each encrypted search vector. The distance may be based on a Euclidean (e.g., straight line) distance. A semantic similarity, or lack thereof, between each word string and the search query may be determined by decrypting the encrypted distance. For example, the encrypted distance may be sent from a server to a client, so that the client may safely decrypt the distances, and thereby determine the semantic similarity in a secure environment. Continuing this example, when the semantic similarity of a word string in a document is sufficiently close to the search query, the result of encrypting the document may then be requested from the server by the client.

FIG. 1 shows a computer system (100) in accordance with one or more embodiments of the invention. As shown in FIG. 1, the computer system (100) includes a repository (102), a vector manager (104), and a cryptography manager (106). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes documents (110A, 110N), a search query (114), a private key (116), and a public key (118). In one or more embodiments, each document (110A) is a file that may be represented using various file formats (e.g., American Standard Code for Information Interchange (ASCII) or Portable Document Format (PDF)). In one or more embodiments, each document (110A) includes one or more word strings (112A, 112N). A word string (112A) may be a series of one or more words. Each word may be a string of alphanumeric characters. Examples of word strings (112A) may include an entire document (110A), a collection of one or more words (e.g., a set of keywords), one or more paragraphs, etc.

In one or more embodiments, the search query (114) includes one or more search terms (115A, 115N) that represent search criteria of a user (e.g., relative to a document (110A)). For example, the search query (114) may include a Boolean combination of search terms (115A, 115N). Each search term (115A) may be a word string (e.g., 112A). Examples of search terms (115A) may include an entire document (110A), a collection of one or more words, one or more paragraphs, etc.

In one or more embodiments, the private key (116) is an encryption key generated according to a homomorphic encryption scheme. Distribution of the private key (116) (e.g., by a key authority) may be limited. For example, distribution of the private key (116) may be restricted to one or more clients. Alternatively, distribution of the private key (116) may be restricted to a client and a server. In contrast, the public key (118) may be publicly available.

An encryption scheme is homomorphic when the result of an operation performed on two unencrypted vectors is equal to the result of decrypting the result of performing an analogous operation, specified by the homomorphic encryption scheme, on the encrypted versions of the two vectors. In one or more embodiments, the homomorphic encryption scheme is based on asymmetric encryption, where, for example, vector representations of documents (110A, 110N) may be encrypted using the public key (118) and may then be decrypted using the corresponding private key (116). In one or more embodiments, the homomorphic encryption scheme is based on symmetric encryption, where vector representations of documents (110A, 110N) may be both encrypted and decrypted using the private key (116) (e.g., where no public key (118) is used).

Continuing with FIG. 1, in one or more embodiments, the vector manager (104) may be implemented in hardware (e.g., circuitry), software, firmware, and/or any combination thereof. The vector manager (104) may include functionality to generate word string vectors (120A, 120N) corresponding to word strings (112A, 112N) of a document (110A). Similarly, the vector manager (104) may include functionality to generate one or more search vectors (122) corresponding to each search term (115N) of a search query (114).

Figure 2A:
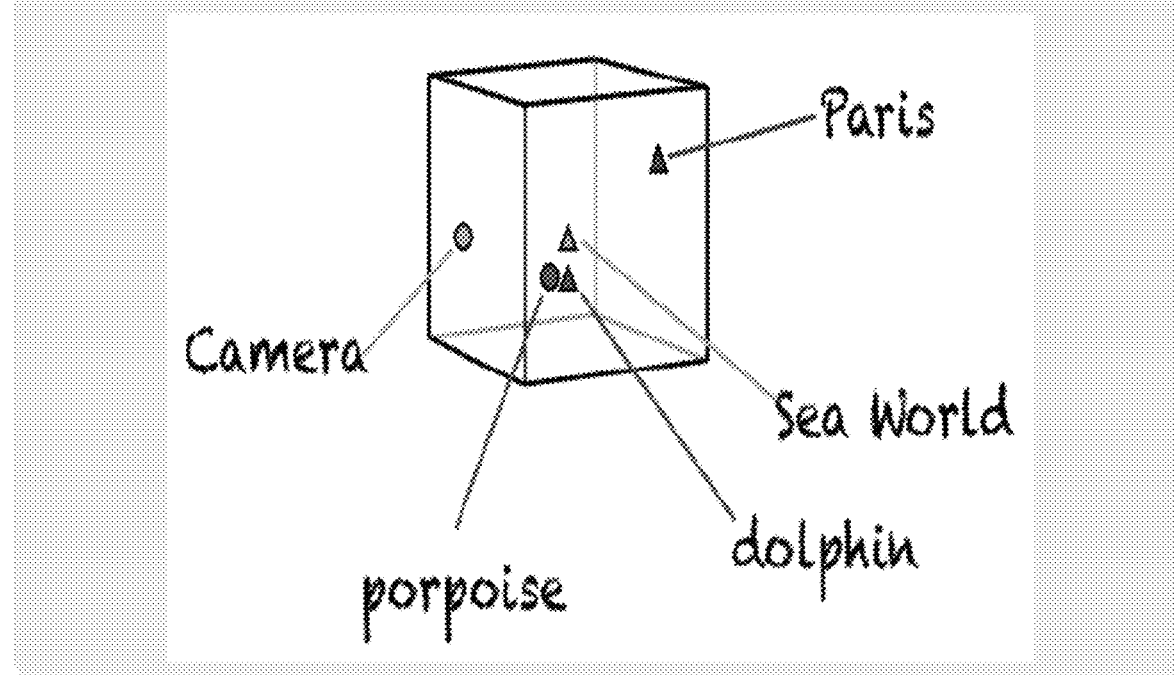

In one or more embodiments, a word string vector (120N) is a semantic representation of a word string (112N) that includes a vector (e.g., a point) in a multi-dimensional semantic space. For illustrative purposes, such a semantic space (200) is shown in FIG. 2A ("Distributional Semantics: Extracting Meaning from Data, Lecture 1: Linguistic Foundations of Distributional Semantics (University of Oslo, 26 Oct. 2016), Andrey Kutuzov") (hereafter "Distributional Semantics"). In one or more embodiments, the value assigned to each dimension of a word string vector (120N) corresponding to a word string (112N) may be based on the co-occurrence or frequency of co-occurrence of the word string (112N) with another word string in a training corpus. The training corpus may include documents (110A, 110N) related to a specific domain (e.g., law, business, physics, etc.). Alternatively, the training corpus may be user-specific. That is, the training corpus may include documents (110A, 110N) that a user has chosen, or that a user has previously accessed. For example, using a domain-specific or user-specific training corpus may reduce the probability that a word string (112N) will bear multiple meanings. In one or more embodiments, the training corpus may be domain-independent. In one or more embodiments, the value assigned to each dimension of a word string vector (120N) is a real value.

Figure 2B:

In one or more embodiments, word strings (112A, 112N) that appear in similar contexts correspond to word string vectors (120A, 120N) that are near each other in the multi-dimensional semantic space (e.g., as measured by a semantic distance function). In the simplest case, a co-occurrence may happen when word strings (112A, 112N) occur next to or near each other in a training corpus. For illustrative purposes, FIG. 2B from Distributional Semantics shows the symmetric word-word co-occurrence matrix (210) of some document (not shown).

In one or more embodiments, the repository (102) includes a table of word string vectors (not shown) that stores the word string vector (120N) generated for each word string (112N).

In an example embodiment, the vector manager (104) may be implemented using open-source software, such as word2vec at Google Code, which is based on Mikolov et al., "Efficient Estimation of Word Representations in Vector Space"(Sep. 7, 2013), GloVe, which is based on Pennington et al., "GloVe (Global Vectors for Word Representation)" (2014), sense2vec, BERT, etc.

In one or more embodiments, the cryptography manager (106) includes functionality to generate encrypted word string vectors (130A, 130N) from word string vectors (120A, 120N). In one or more embodiments, an encrypted word string vector (130N) is an encrypted representation of a word string vector (120N). For example, the encrypted word string vector (130N) may be generated using a private key (116) or a public key (118) of a homomorphic encryption scheme. Similarly, the cryptography manager (106) may include functionality to generate an encrypted search vector (132) from a search vector (122). In one or more embodiments, the cryptography manager (106) includes functionality to decrypt encrypted word string vectors (130A, 130N) to recover the original word string vectors (120A, 120N).

In one or more embodiments, the cryptography manager (106) includes functionality to calculate a distance between a search vector (122) and a word string vector (120N). The distance between the search vector (122) and the word string vector (120N) may represent a semantic distance between the search query (114) and the word string (112N) corresponding to the word string vector (120N). In one or more embodiments, the distance between the search vector (122) and the word string vector (120N) may be based on a Euclidean (e.g., straight line) distance.

In one or more embodiments, the cryptography manager (106) includes functionality to calculate an encrypted distance between an encrypted search vector (132) and an encrypted word string vector (130N). The encrypted distance may encrypt a semantic distance between the search query (114) corresponding to the encrypted search vector (132) (e.g., the search query (114) whose corresponding search vector (122) was encrypted to generate the encrypted search vector (132)) and the word string (112N) corresponding to the encrypted word string vector (130N) (e.g., the word string (112N) whose corresponding word string vector (120N) was encrypted to generate the encrypted word string vector (130N)). The homomorphic encryption scheme may specify a distance function as an operation with an analogous operation. It may calculate the analogue of a distance between the encrypted search vector (132) and the encrypted word string vector (130N), where the result of decrypting the result of the calculation may be equal to the result of calculating the distance between the search vector (122) and word string vector (120N). In one or more embodiments, the cryptography manager (106) includes functionality to decrypt an encrypted distance between an encrypted search vector (132) and an encrypted word string vector (130N).

In one or more embodiments, the cryptography manager (106) may be implemented in hardware (e.g., circuitry), software, firmware, and/or any combination thereof. The cryptography manager (106) may be a collection of source code used to build software applications or components. That is, the cryptography manager (106) may be a collection of computer instructions written in a human-readable programming language. The cryptography manager (106) may be transformed by a compiler program into binary machine code. Compiled machine code may then be executed by a processor (e.g., computer processor(s) (502) of FIG. 5A) in order to run the cryptography manager (106).

While FIG. 1 shows a configuration of components, other configurations may be used without departing from the scope of the invention. For example, various components may be combined to create a single component. As another example, the functionality performed by a single component may be performed by two or more components.

Figure 3:
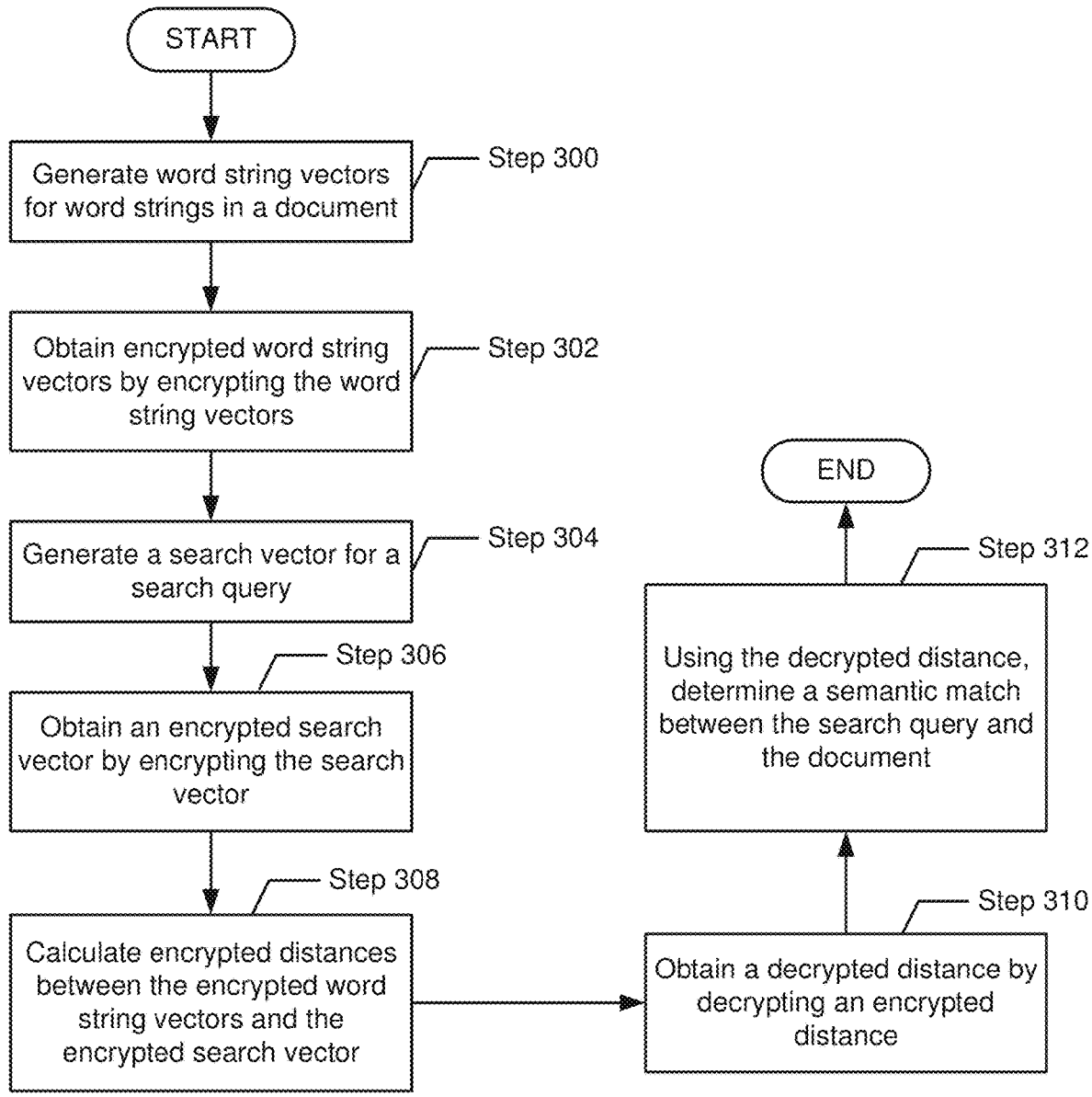
FIG. 3 shows a flowchart in accordance with one or more embodiments of the invention.

FIG. 3 shows a flowchart in accordance with one or more embodiments of the invention. The flowchart depicts a process for secure word search. One or more of the steps in FIG. 3 may be performed by the components (e.g., the vector manager (104) or the cryptography manager (106) of the computer system (100)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, word string vectors are generated for word strings in a document. In one or more embodiments, the document is a file that may be represented using various file formats. In one or more embodiments, each word string vector is a vector in a multi-dimensional semantic space. The value assigned to each dimension of a word string vector may be based on the co-occurrence or frequency of co-occurrence of the word string with another word string in a training corpus. Word strings that appear in similar contexts may correspond to word string vectors that are near each other in the multi-dimensional semantic space (e.g., as measured by a semantic distance function). In one or more embodiments, word string vectors are generated for word strings in each of a set of documents. Each document in the set of documents may correspond to, and be identified by a document identifier.

In one or more embodiments, the generation of word string vectors may be limited to "root" words. For example, one or more prefixes and/or suffixes of a word (e.g., "un", "anti", "ly", "ing", "tion", etc.) may be removed from one or more word strings before generating a word string vector.

In Step 302, encrypted word string vectors are obtained by encrypting the word string vectors. For example, each encrypted word string vector may be generated using a public key or a private key of a homomorphic encryption scheme.

In one or more embodiments, prior to encrypting the word string vector, each real (e.g., non-integer) value of the word string vector is converted to an integer value. For example, the encryption scheme may require that inputs to be encrypted be represented as integers. In one or more embodiments, each value of the word string vector is first multiplied by a constant value (e.g., the integer 100) before converting the value to an integer value (e.g., to reduce any potential loss of precision due to converting non-integer values to integer values).

In one or more embodiments, prior to encrypting the word string vector, each real (e.g., non-integer) value of the word string vector can alternatively be approximated to a floating point value of lower precision. For example, the encryption scheme may require inputs to be encrypted with limited precision. In one or more embodiments, each value of the word string vector is approximated through truncation or rounding.

In Step 304, a search vector is generated for a search query. In one or more embodiments, a search vector is generated for each search term in the search query. In one or more embodiments, the search vector is a semantic representation that includes a vector in a multi-dimensional semantic space.

In Step 306, an encrypted search vector is obtained by encrypting the search vector (see description of Step 302 above). In one or more embodiments, an encrypted search vector is generated for each search vector generated in Step 304 above.

In Step 308, an encrypted distance between each encrypted word string vector and the encrypted search vector is obtained. A server may perform the encryption. In one or more embodiments, the calculation of each encrypted distance may proceed in parallel (e.g., in separate cores of a processor). The encrypted distance may encrypt a semantic distance between the search query corresponding to the encrypted search vector (e.g., the search query whose corresponding search vector was encrypted to generate the encrypted search vector) and the word string corresponding to the encrypted word string vector (e.g., the word string whose corresponding word string vector was encrypted to generate the encrypted word string vector). For example, using a homomorphic encryption scheme, calculating the function application, in which the applied function is the function that corresponds, according to the scheme, to distance, and the arguments are the encrypted search vector and the encrypted word string vector, may be equal to the encrypted result of calculating the distance between the search vector and word string vector.

The encrypted distance may be calculated by applying an operation analogous to a Euclidean (e.g., straight line) distance. The distance may be calculated using a variety of methods, provided that the distance and its analogous operation satisfy the constraints of homomorphic encryption. For example, the distance may be calculated as the square root of the sum of the squares of the differences between corresponding values (e.g., coordinates) of the search vector and the word string vector. Alternatively, the distance may be calculated as the sum of the squares of the differences between corresponding values of the search vector and the word string vector.

In one or more embodiments, the encrypted distances between the encrypted search vector and each word string vector are combined together using the homomorphic analogue of multiplication defined by the homomorphic encryption scheme. If the result is an encryption of 0, then at least one of the encrypted distances between a word string vector and the search vector is an encryption of 0. Therefore, it may be inferred that at least one word string in the document exactly matched the search query, and Steps 310 and 312 below may be omitted. In one or more embodiments, the analogue of multiplication in the homomorphic encryption scheme may be multiplication. For example, the encrypted distances between the encrypted search vector and each word string vector may be combined together using multiplication.

In one or more embodiments, a separate encrypted distance is calculated between each encrypted search vector generated in Step 306 above and the encrypted word string vector. The separate encrypted distances may be combined into one or more aggregate values. One or more of the aggregate values may be encrypted. For example, the separate encrypted distances may be combined into a pair of aggregate values, where the first aggregate value may be an encrypted weighted sum of the separate distances, calculated using the homomorphic analogues of multiplication and addition without decrypting the separate encrypted distances, and the second aggregate value may be the number of separate encrypted distances that have been combined.

In one or more embodiments, encrypted small distances are converted (e.g., homomorphically) into encryptions of zero. A server may perform the conversion. For example, encryptions of distances that are less than a threshold may be converted to encryptions of zero. Continuing this example, a lookup table may be used to accelerate the conversion by mapping encrypted distances to either zero or one. Next, in one or more embodiments, the converted encrypted distances are multiplied together to obtain a multiplicative result. The multiplicative result may be a single number. The multiplicative result may be returned to a user. When there is a set of documents, the multiplicative result for each document may be returned to the user along with the document identifier corresponding to the document.

In Step 310, a decrypted distance is obtained by decrypting the encrypted distance calculated in Step 308 above. For example, the encrypted distance may be decrypted using a private key. In one or more embodiments, the multiplicative result returned in Step 308 above is decrypted (e.g., by the user).

In Step 312, a semantic match between the search query and the document is determined, in response to the decrypted distance being within a threshold distance. A decrypted distance of zero may indicate an exact match between the search query and a word string in the document (e.g., the search query matches a word string in the document). Alternatively, a non-zero decrypted distance may indicate a degree of semantic similarity or semantic dissimilarity between the word string in the document and the search query.

In one or more embodiments, the user engages in a Private Information Retrieval (PIR) protocol with the server, thus enabling the user to retrieve the documents matching the search query without revealing which documents were retrieved by the server.

In one or more embodiments, the threshold distance may be set by a user (e.g., as a global configuration parameter, or for each individual search query). In one or more embodiments, the threshold distance may be set by a machine learning algorithm. For example, the training set for the machine learning algorithm may include the threshold distances corresponding to previous search queries of the user.

Figure 4:
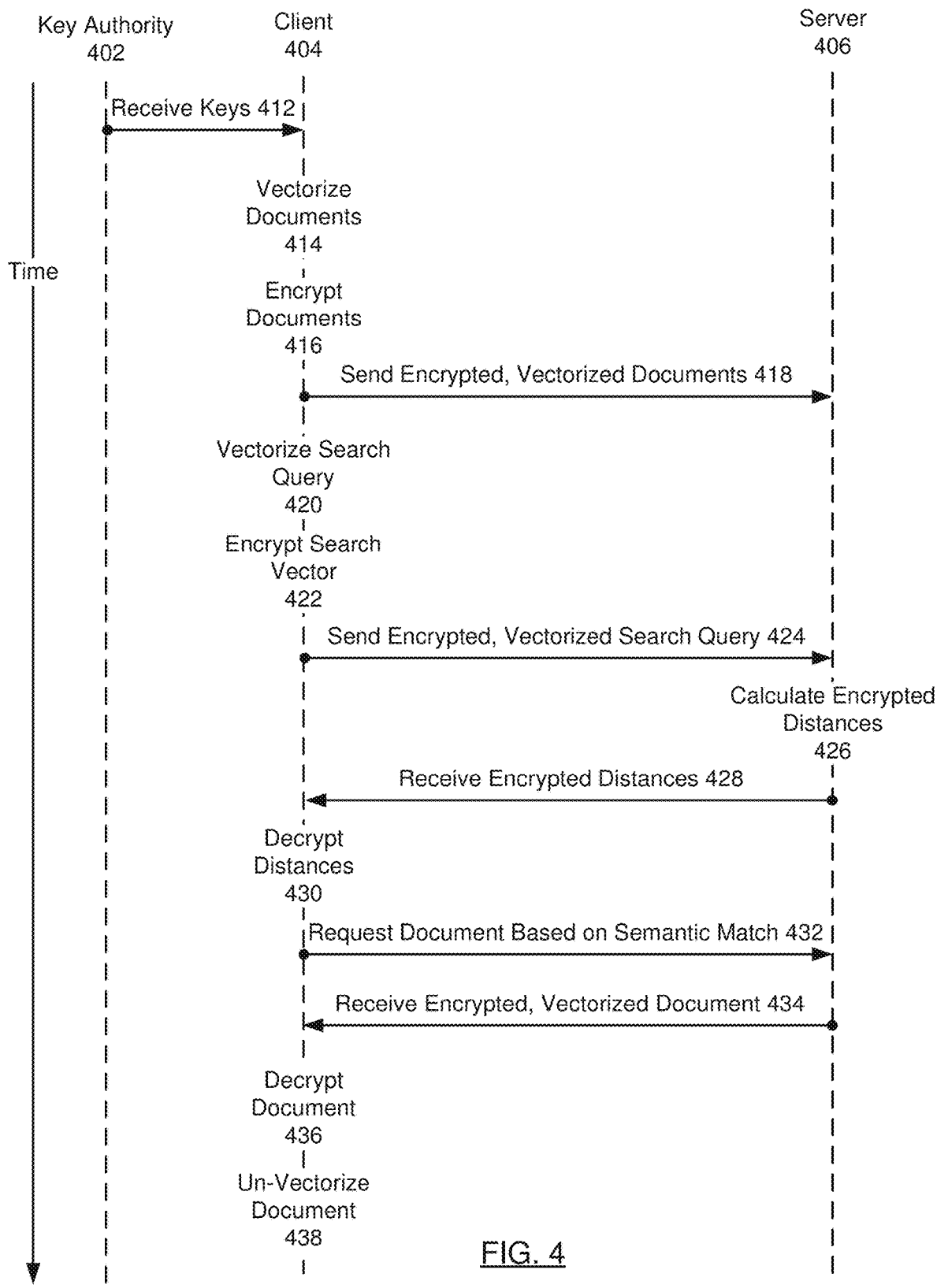
FIG. 4 shows an example in accordance with one or more embodiments of the invention.

The following example is for explanatory purposes only and not intended to limit the scope of the invention. FIG. 4 shows an implementation example in accordance with one or more embodiments of the invention. In this example, a client (404) sends encrypted vectorized documents to a server (406) and later sends an encrypted vectorized search query (consisting of the search term "secure") to the server (406) to retrieve the documents satisfying the search query.

Initially, in Step 412, a client (404) receives a key pair consisting of a public key and a private key from a key authority (402). In this example, the client (404) performs the functionality of both the vector manager ((104) in FIG. 1) and the cryptography manager ((106) in FIG. 1).

In Step 414, the vector manager (104) generates a word string vector for each word string in each document, resulting in vectorized documents (see description above of Step 300 in FIG. 3). Each vectorized document includes word string vectors corresponding to each "root" word (e.g., with prefixes and suffixes removed) of the corresponding document. The word string vector corresponding to each word string is stored in a table of word string vectors.

Next, in Step 416, the cryptography manager (106) encrypts the word string vectors of each vectorized document (see description above of Step 302 in FIG. 3), resulting in encrypted, vectorized documents. Each word string vector of each vectorized document is encrypted using the public key obtained in Step 412 above.

In Step 418, the client (404) sends the encrypted, vectorized documents to a server (406). The server (406) maintains a repository of encrypted documents, and processes queries regarding these encrypted documents. The client (404) destroys any local unencrypted copies of the documents.

In Step 420, the vector manager (104) generates a search vector for each search term in a search query, resulting in a vectorized search query (see description above of Step 304 in FIG. 3). In this case, the search query consists of a single search term: "secure", and the vectorized search query consists of a single search vector.

In Step 422, the cryptography manager (106) encrypts the search vectors of the search query (see description above of Step 306 in FIG. 3), resulting in an encrypted, vectorized search query. The search vector of the search query is encrypted using the public key obtained in Step 412 above. In an alternate scenario not based on a public key encryption scheme, the search query may be encrypted using a private key.

In Step 424, the client (404) sends the encrypted, vectorized search query to the server (406).

In Step 426, the server (406) calculates an encrypted distance between the encrypted search vector and each encrypted word string vector of each encrypted, vectorized document (see description above of Step 308 in FIG. 3). Each encrypted distance represents a semantic distance between the search query and the word string corresponding to the encrypted word string vector.

In Step 428, the server (406) sends the encrypted distances calculated above in Step 426 to the client (404).

In Step 430, the cryptography manager (106) decrypts the encrypted distances. Each encrypted distance is decrypted using the private key obtained in Step 412 above.

In Step 432, the client (404) requests a document from the server (406) after detecting a semantic match between a word string in the document and the search query. The semantic match is detected when a decrypted distance between a word string in the document and the search query is within a threshold. When the decrypted distance is zero, the client (404) detects an exact match (i.e., the search term "secure" appears in the document). Alternatively, a non-zero decrypted distance indicates a degree of semantic similarity (or lack thereof) between the search query and the word string corresponding to the decrypted distance.

In Step 434, the client (404) receives the encrypted, vectorized document from the server (406). The server (406) stops calculating encrypted distances for the encrypted, vectorized document that was just sent to the client (404), but continues calculating encrypted distances for the remaining encrypted, vectorized documents.

In Step 436, the cryptography manager (106) decrypts the word string vectors of the vectorized document, resulting in a decrypted, vectorized document.

In Step 438, the vector manager (104) generates an un-vectorized document from the decrypted, vectorized document by obtaining, from the table of word string vectors (see description of Step 414 above), the word string corresponding to each word string vector. The un-vectorized document is equivalent to the original document that was vectorized in Step 414 above.

In an alternate security scenario (e.g., a banking scenario), the task of decrypting distances is assigned to a secure decryption server, instead of the client (404). In this alternate scenario, the server (406) sends the encrypted distances calculated above in Step 426 to the secure decryption server, which decrypts the encrypted distances as they arrive. The secure decryption server then instructs the server (406) to send a document to the client (404) after detecting a semantic match between a word string in the document and the search query (i.e., when the corresponding decrypted distance is within the threshold).

The pseudocode below describes an implementation example in accordance with one or more embodiments of the invention. This example is provided for purposes of illustration and is not intended to limit the scope of the invention to the particular details disclosed therein.

```
function multiplyByMatrixToGetDistance(calc_vector)
    plaintext_matrix=[[1, 1, 1, ... ], [0, 0, 0, ... ], ... ]//Create
        matrix with first row make up of 1's and all other
        entries 0's—this can be a global constant, as long as the
        dimensions are n×n, where n is the length of the
        encrypted word vectors
    return plaintext_matrix*calc_vector
function calculateDistance(vec1, vec2, zero_vector)
    calc_vector=zero_vector
    calc_vector+=vec1
    calc_vector-=vec2
    calc_vector*=calc_vector
    result=multiplyByMatrixToGetDistance(calc_vector)
    return result
function encryptDocument(public_key, document_to_encrypt, word_to_vector_table)
    encrypted_document=[]
    for word in document_to_encrypt
        word_vector=lookup_vector_in_table(word, word_to_vector_table)
        for i from 0 to length(word_vector)
            word_vector[i]=floatToInt(word_vector[i]*100) #or
                *some other chosen precision
        encrypted_word_vector=encrypt(word_vector, public_key)
        encrypted_document.append(encrypted_word_vector)
    return encrypted_document//Encrypted document can be
        sent to server, for example; original document can be
        deleted
function searchForKeyword(encrypted_document, keyword, public_key, word_to_vector_table)
    keyword_vector=lookup_vector_in_table(keyword, word_to_vector_table)
    for i from 0 to length(keyword_vector)
        keyword_vector[i]=floatToInt(keyword_vector[i]
            *100) #or *some other chosen precision
    encrypted_keyword_vector=encrypt(keyword_vector, public_key)
    encrypted_zero_vector=encrypt(zero_vector, public_key)
    encrypted_matrix_of_distances=[]
    for vector in encrypted_document
        result=calculateDistance(vector, zero_vector)
        encrypted_matrix_of_distances.append(result)
    return encrypted_matrix_of_distances//Return result to
        computer with access to private_key
function decryptDistanceMatrix(encrypted_matrix_of_distances, private_key, distance_threshold)//Distance threshold should be set depending on user's needs and type of vectors used in the lookup table
    for i from 0 to length(encrypted_matrix_of_distances)
        decrypted_distance decrypt(encrypted_matrix_of_distances[i], private_key)
        decrypted_distance=decrypted_distance[0]//Only
            select the first vector entry—all other entries should
            be 0's
        if decrypted_distance>=distance_threshold
            return 1
    return 0
```

Figure 5A:
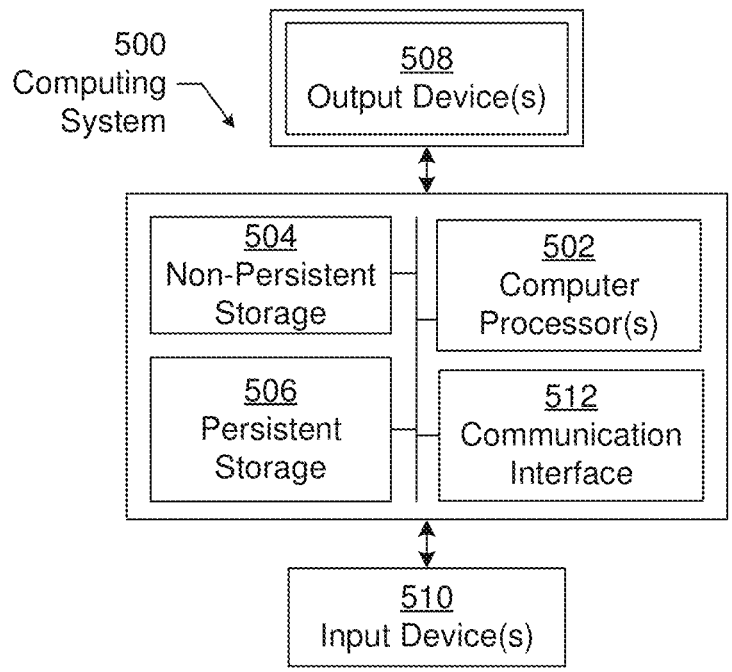
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
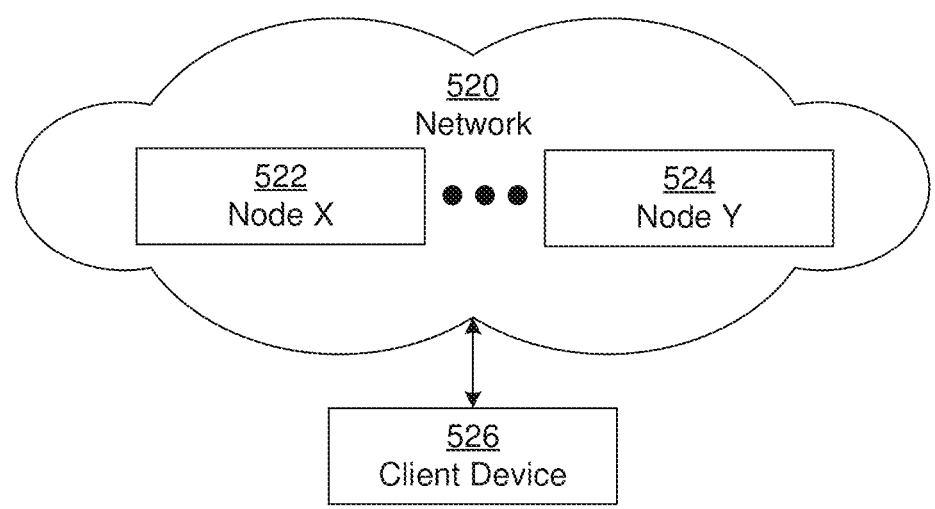

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
generating one or more word string vectors for one or more word strings in a document;
obtaining one or more encrypted word string vectors by encrypting the one or more word string vectors, wherein the one or more word string vectors represent meanings of the one or more word strings as points in a multi-dimensional semantic space;
generating a search vector for a search query, wherein the search vector is in a multi-dimensional semantic space;
obtaining an encrypted search vector by encrypting the search vector;
calculating one or more encrypted distances between the one or more encrypted word string vectors and the encrypted search vector;
obtaining a decrypted distance by decrypting an encrypted distance of the one or more encrypted distances; and
using the decrypted distance, determining a semantic match between the search query and the document,
wherein the one or more word string vectors and the search vector are each semantic representations of a natural language word string that includes a vector in the multi-dimensional semantic space with a value assigned to each dimension of the vector based at least partially on semantic co-occurrences in a corpus of natural language documents.

2. The method of claim 1, wherein the search query comprises a first search term and a second search term, the method further comprising:
generating a first search term vector for the first search term; and
generating a second search term vector for the second search term.

3. The method of claim 2, further comprising:
obtaining a first encrypted search term vector by encrypting the first search term vector; and
obtaining a second encrypted search term vector by encrypting the second search term vector, wherein the encrypted distance is calculated using the first encrypted search term vector and the second encrypted search term vector.

4. The method of claim 3, wherein the encrypted distance is calculated as an encrypted weighted sum of a first distance corresponding to the first search term vector and a second distance corresponding to the second search term vector, and wherein the weighted sum is calculated using homomorphic analogues of multiplication and addition applied to a first encrypted distance corresponding to the first search term vector and a second encrypted distance corresponding to the second search term vector.

5. The method of claim 1, wherein the semantic match is determined when the decrypted distance is less than a threshold distance.

6. The method of claim 1, further comprising:
obtaining a multiplication result by combining the one or more encrypted distances together using a homomorphic analogue of multiplication defined by a homomorphic encryption scheme.

7. The method of claim 6, wherein the multiplication result is obtained by combining the one or more encrypted distances together using multiplication, wherein the homomorphic encryption scheme defines the homomorphic analogue of multiplication to be multiplication.

8. A system, comprising:
a computer processor;
a repository comprising a search query and one or more documents comprising one or more word strings;
a vector manager executing on the computer processor configured to:
generate one or more word string vectors for one or more word strings of a document of the one or more documents, wherein the one or more word string vectors represent meanings of the one or more word strings as points in a multi-dimensional semantic space;

generate a search vector for the search query, wherein the search vector is in the multi-dimensional semantic space; and
using a decrypted distance, determine a semantic match between the search query and the document; and a cryptography manager executing on the computer processor configured to:
obtain one or more encrypted word string vectors by encrypting the one or more word string vectors;
obtain an encrypted search vector by encrypting the search vector;
calculate one or more encrypted distances between the one or more encrypted word string vectors and the encrypted search vector; and
obtain the decrypted distance by decrypting an encrypted distance of the one or more encrypted distances,
wherein the one or more word string vectors and the search vector are each semantic representations of a natural language word string that includes a vector in the multi-dimensional semantic space with a value assigned to each dimension of the vector based at least partially on semantic co-occurrences in a corpus of natural language documents.

9. The system of claim 8, wherein the search query comprises a first search term and a second search term, and wherein the vector manager is further configured to:
generate a first search term vector for the first search term; and
generate a second search term vector for the second search term.

10. The system of claim 9, wherein the search query comprises a first search term and a second search term, and wherein the cryptography manager is further configured to:
obtain a first encrypted search term vector by encrypting the first search term vector; and
obtain a second encrypted search term vector by encrypting the second search term vector, wherein the vector manager calculates the encrypted distance using the first encrypted search term vector and the second encrypted search term vector.

11. The system of claim 10, wherein the cryptography manager is further configured to calculate the encrypted distance as an encrypted weighted sum of a first distance corresponding to the first search term vector and a second distance corresponding to the second search term vector, and wherein the weighted sum is calculated using homomorphic analogues of multiplication and addition applied to a first encrypted distance corresponding to the first search term vector and a second encrypted distance corresponding to the second search term vector.

12. The system of claim 8, wherein the vector manager is further configured to determine the semantic match when the decrypted distance is less than a threshold distance.

13. The system of claim 8, wherein the vector manager is further configured to:
obtain a multiplication result by combining the one or more encrypted distances together using a homomorphic analogue of multiplication defined by a homomorphic encryption scheme.

14. The system of claim 13, wherein the vector manager is further configured to obtain the multiplication result by combining the one or more encrypted distances together using multiplication, wherein the homomorphic encryption scheme defines the homomorphic analogue of multiplication to be multiplication.

15. A non-transitory computer readable medium comprising instructions that, when executed by a computer processor, perform:
generating one or more word string vectors for one or more word strings in a document, wherein the one or more word string vectors represent meanings of the one or more word strings as points in a multi-dimensional semantic space;
obtaining one or more encrypted word string vectors by encrypting the one or more word string vectors;
generating a search vector for a search query, wherein the search vector is in the multi-dimensional semantic space;
obtaining an encrypted search vector by encrypting the search vector;
calculating one or more encrypted distances between the one or more encrypted word string vectors and the encrypted search vector;
obtaining a decrypted distance by decrypting an encrypted distance of the one or more encrypted distances; and
using the decrypted distance, determining a semantic match between the search query and the document,
wherein the one or more word string vectors and the search vector are each semantic representations of a natural language word string that includes a vector in the multi-dimensional semantic space with a value assigned to each dimension of the vector based at least partially on semantic co-occurrences in a corpus of natural language documents.

16. The non-transitory computer readable medium of claim 15, wherein the instructions further perform:
generating a first search term vector for the first search term; and
generating a second search term vector for the second search term.

17. The non-transitory computer readable medium of claim 16, wherein the instructions further perform:
obtaining a first encrypted search term vector by encrypting the first search term vector; and
obtaining a second encrypted search term vector by encrypting the second search term vector, wherein the encrypted distance is calculated using the first encrypted search term vector and the second encrypted search term vector.

18. The non-transitory computer readable medium of claim 17, wherein the encrypted distance is calculated as an encrypted weighted sum of a first distance corresponding to the first search term vector and a second distance corresponding to the second search term vector, and wherein the weighted sum is calculated using homomorphic analogues of multiplication and addition applied to a first encrypted distance corresponding to the first search term vector and a second encrypted distance corresponding to the second search term vector.

19. The non-transitory computer readable medium of claim 15, wherein the semantic match is determined when the decrypted distance is less than a threshold distance.

20. The non-transitory computer readable medium of claim 15, wherein the instructions further perform:
obtaining a multiplication result by combining the one or more encrypted distances together using a homomorphic analogue of multiplication defined by a homomorphic encryption scheme.

* * * * *